US005550823A

United States Patent [19]
Irie et al.

[11] Patent Number: 5,550,823
[45] Date of Patent: Aug. 27, 1996

[54] METHOD AND APPARATUS FOR PERFORMING PRIORITY CONTROL FOR CELLS IN OUTPUT BUFFER TYPE ATM SWITCH

[75] Inventors: Yasuhito Irie; Kenji Yamada, both of Tokyo, Japan

[73] Assignee: NEC Corporation, Tokyo, Japan

[21] Appl. No.: 430,385

[22] Filed: Apr. 28, 1995

[30] Foreign Application Priority Data

Apr. 28, 1994 [JP] Japan .................................. 6-111819

[51] Int. Cl.$^6$ .................................................. H04L 12/56
[52] U.S. Cl. ........................................ 370/60.1; 370/85.6
[58] Field of Search .......................... 370/53, 58.1, 60, 370/60.1, 85.6; 379/112

[56] References Cited

U.S. PATENT DOCUMENTS

| | | | |
|---|---|---|---|
| 5,062,106 | 10/1991 | Yamazaki et al. | 370/60 |
| 5,278,828 | 11/1994 | Chao | 370/60 |
| 5,406,556 | 4/1995 | Widjaja | 370/60 |

FOREIGN PATENT DOCUMENTS 4-207543  7/1992  Japan .

*Primary Examiner*—Benedict V. Safourek
*Attorney, Agent, or Firm*—Foley & Lardner

[57] ABSTRACT

There is provided a method of performing priority control for cells in an output buffer type ATM switch including a switching unit, having a plurality of input ports and a plurality of output ports, for switching/outputting the cells input from the input ports to the output ports in accordance with routing information, and a plurality of output buffer units having output buffer memories, connected to the output ports of the switching unit, for temporarily storing the cells output from the output ports to perform output control of the cells. A loss quality class, a delay quality class and the routing information are added to each of the cells. A plurality of logical queues for temporarily storing the cells are virtually set in an input buffer memory in accordance with the delay quality classes and the routing information. The input cells are selectively written in the logical queues on the basis of the loss quality classes and the routing information added to the cells. A transition process is performed for all the logical queues to change the delay quality class of each of the logical queues into one of upper and lower classes depending on a cell storage amount in the logical queue. Upon completion of the transition process, the cells are read from the logical queue having the delay quality class which is an uppermost class.

13 Claims, 7 Drawing Sheets

5,550,823

METHOD AND APPARATUS FOR PERFORMING PRIORITY CONTROL FOR CELLS IN OUTPUT BUFFER TYPE ATM SWITCH

BACKGROUND OF THE INVENTION

The present invention relates to a method and apparatus for performing priority control for cells in an ATM (Asynchronous Transfer Mode) switch of an ATM switching system and, more particularly, to a method and apparatus for performing priority control for cells in an output buffer type ATM switch for changing a delay quality class added to each ATM cell to control the ATM cell.

In a conventional ATM switching system, when ATM cells, the number of which exceeds the switching capability of an ATM switch for performing switching between a plurality of input/output lines, are input, an order of cell losses, an order of reading cells temporarily stored in the ATM switch, or the like is set as loss characteristics or delay characteristics in advance, and priority control is performed on the basis of these characteristics (see Japanese Patent Laid-Open No. 4-207543).

FIG. 7 shows a priority control apparatus for cells in a conventional ATM switch. Referring to FIG. 7, reference numerals 71 denote a plurality of cell loss units each of which selectively causes an input cell loss; 72, buffer memories each of which stores a cell output from each cell loss unit 71 in a plurality of areas divided depending on the loss quality classes; 73, buffer amount measuring units each of which measures a buffer use amount in each buffer memory 72; 74, a selector for selecting/outputting a cell from a predetermined one of the buffer memories 72; 75, a loss controller for outputting a cell loss instruction to each cell loss unit 71 on the basis of predetermined loss characteristics; and 76, a delay controller for outputting a cell read instruction to the selector 74 on the basis of predetermined delay characteristics.

An operation related to conventional priority control for cells will be described below. First, a priority class CL(m, n) (where $m$ is a loss quality class, and $n$ is a delay quality class) corresponding to loss characteristics and delay characteristics is added to each cell. A cell loss occurs at a high probability as the loss quality class of the cell is higher, and a cell is delayed at a low probability as the delay quality class of the cell is lower. Input cells are distributed to the cell loss units 71 arranged for respective loss quality classes in accordance with the loss quality classes.

In this case, the loss controller 75 examines a total buffer use amount on the basis of outputs from the buffer amount measuring unit 73, and loss characteristics are referred to on the basis of the buffer use amount to check whether the loss quality class of each input cell is a cell loss class. This determination result is output to a corresponding one of the cell loss units 71. The cell loss unit 71 causes the input cell loss when an output from the loss controller 75 indicates that the input cell loss should occur. When the output from the loss controller 75 indicates that the input cell should be stored, the cell loss unit 71 stores the input cell in one of the divided areas corresponding to the delay quality class of the input cell in the buffer memory 72 corresponding to the loss quality class of the input cell, i.e., a priority class CL(m, n).

In addition, although it is determined that the input cell should be stored, when the buffer memory 72 has no free area, the loss controller 75 instructs the cell loss unit 71 such that the loss of a cell having the lowest class of cells each having a class having a level lower than that of the loss quality class of the stored input cell occur in the buffer memory 72. In this manner, the loss of the cell in the buffer memory 72 occurs, and the input cell is stored in a free area formed by this operation. In this case, when there is no cell having a loss quality class having a level lower than that of the input cell, the input cell loss OCCURS.

The delay controller 76 confirms buffer use amounts in the buffer memories 72 on the basis outputs from the buffer amount measuring units in accordance with a predetermined read timing and instructs the selector 74 to read designated cells each having a lower delay quality class from the buffer memories in which cells are stored. The selector 74 reads cells from the buffer memory 72 designed by the delay controller 76 and outputs cells as output cells from the output terminal of the selector 74.

In the above conventional method and apparatus for performing priority control for cells in an ATM switch, however, a quality class consisting of a loss quality class and a delay quality class is fixedly added to each of-input cells to determine the priority of the input cells, and cells are always read starting from a cell having a higher priority. For this reason, when an excessive traffic is spontaneously (burst) input in each buffer memory having a delay quality class to generate congestion, and a satisfactory delay quality may not be obtained, reading is always started from a cell having a higher delay quality, and the congestion cannot be properly avoided. Therefore, the method and apparatus for performing priority control for cells has a low resistance to such a spontaneous excessive traffic.

SUMMARY OF THE INVENTION

It is an object of the present invention to provide a method and apparatus for performing priority control for cells in an output buffer type ATM switch capable of satisfying set loss and delay qualities.

It is another object of the present invention to provide a method and apparatus for performing priority control for an output buffer type ATM switch having a high resistance to a spontaneously excessive traffic.

In order to achieve the above objects, according to the present invention, there is provided a method of performing priority control for cells in an output buffer type ATM switch including a switching unit, having a plurality of input ports and a plurality of output ports, for switching/outputting the cells input from the input ports to the output ports in accordance with routing information, and a plurality of output buffer units having output buffer memories, connected to the output ports of the switching unit, for temporarily storing the cells output from the output ports to perform output control of the cells, comprising the steps of adding a loss quality class, a delay quality class and the routing information to each of the cells, virtually setting a plurality of logical queues, for temporarily storing the cells, in input buffer memories in accordance with the delay quality classes and the routing information, selectively writing the input cells in the logical queues on the basis of the loss quality classes and the routing information added to the cells, performing a transition process for all the logical queues to change the delay quality class of each of the logical queues into one of upper and lower classes depending on a cell storage amount in the logical queue, and upon completion of the transition process, reading the cells from the logical queue having the delay quality class which is an upper most class.

DESCRIPTION OF THE PREFERRED EMBODIMENT

The present invention will be described below with reference to the accompanying drawings.

Figure 1:
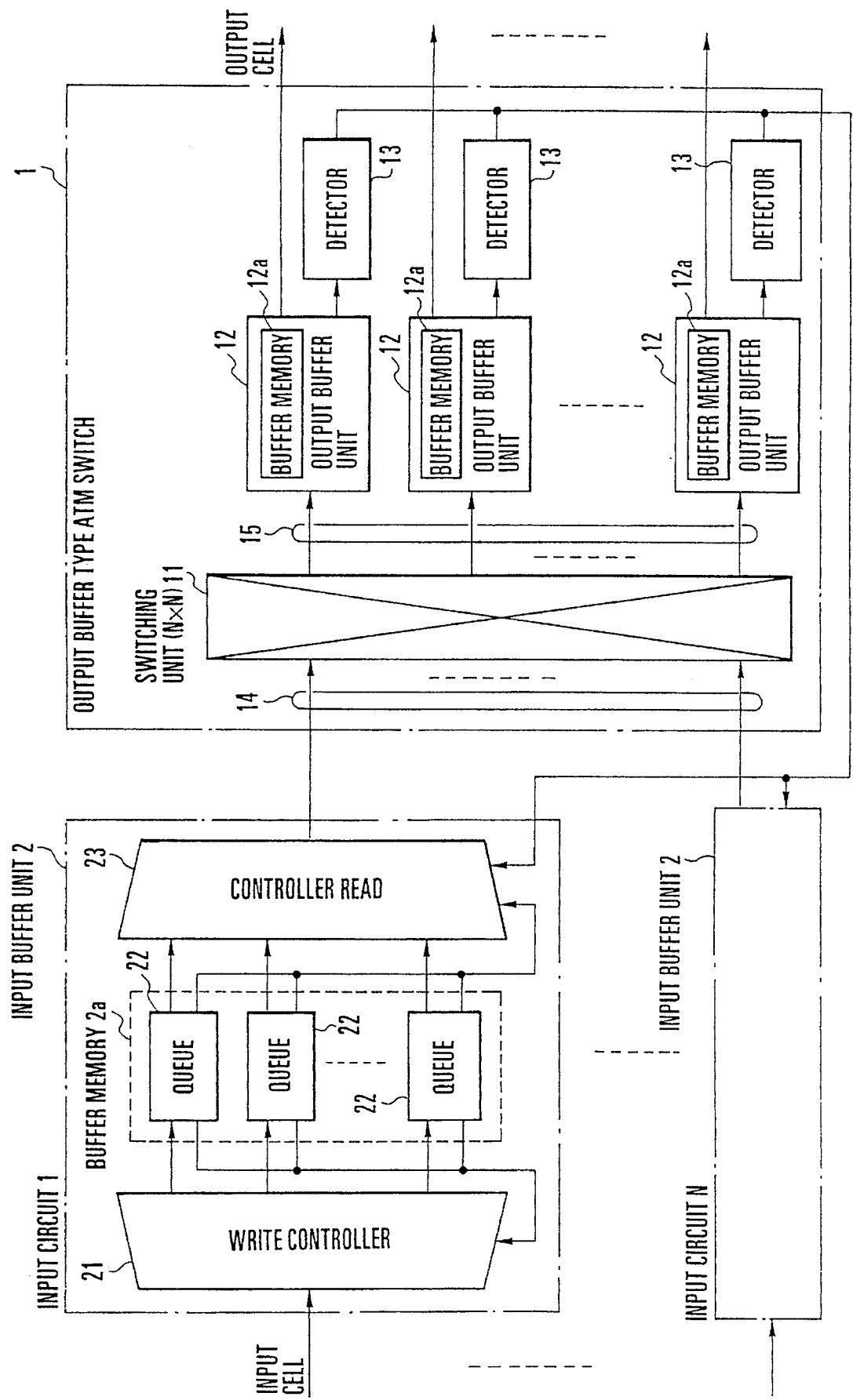
FIG. 1 is a block diagram showing the arrangement of a priority control apparatus for cells in an output buffer type ATM switch according to an embodiment of the present invention.

FIG. 1 shows the arrangement of a priority control apparatus for cells in an output buffer type ATM switch according to an embodiment of the present invention. Referring to FIG. 1, reference numeral 1 denotes an output buffer type ATM switch which performs switching on the basis of routing information (output port number or the like) stored in an input cell and outputs a cell in accordance with the transmission capacity of an output side; and 2, a plurality of input buffer units, respectively, arranged between a plurality of circuits and the ATM switch 1, for performing priority control on the basis of a loss quality class and a delay quality class added to the input cell.

In the ATM switch 1, reference numeral 11 denotes a switching unit, comprising N input ports 14 and N output ports 15, for switching (self-switching) a cell input from each input port 14 to a predetermined output port 15 on the basis of routing information added to the cell; 12, a plurality of output buffer units connected to the output ports 15 and having buffer memories 12a for storing cells output from the output ports 15 depending on priorities and broadcast outputs defined on the basis of the delay quality classes of the cells; and 13, detectors, respectively, arranged for the output buffer units 12, for outputting output buffer threshold exceeding signals to the input buffer units 2 when the numbers of cells stored in the buffer memories 12a in the output buffer units 12 exceed a predetermined threshold. Each buffer memory 12a may be constituted by a plurality of memories to store cells depending on the priorities and broadcast outputs of the cells.

In each input buffer unit 2, reference numerals 22 denote a plurality of logical queues, virtually set in a buffer memory 2a in accordance with delay quality classes and the output port numbers of the switching unit 11, for temporarily storing input cells; 21, a write controller for selectively writing the input cells in the logical queues 22 on the basis of the cell storage amounts of the logical queues 22, delay quality classes added to the input cells, and the output port numbers; 23, a read controller which reads the cells from the logical queues 22 having a higher priority on the basis of the cell storage amounts in the logical queues 22 and the output buffer threshold exceeding signals from the detectors 13 of the ATM switch 1 and outputs the cells to the switching unit 11.

The buffer memory 2a is divided into a plurality of first areas, e.g., each for a delay quality class, and each first area is divided into a plurality of second areas each for a output port number. The logical queues 22 are respectively formed in the second areas of each first area. Note that the relationship between the delay quality classes and the first areas can be replaced with the relationship between the output port numbers and the second areas.

Figure 2:
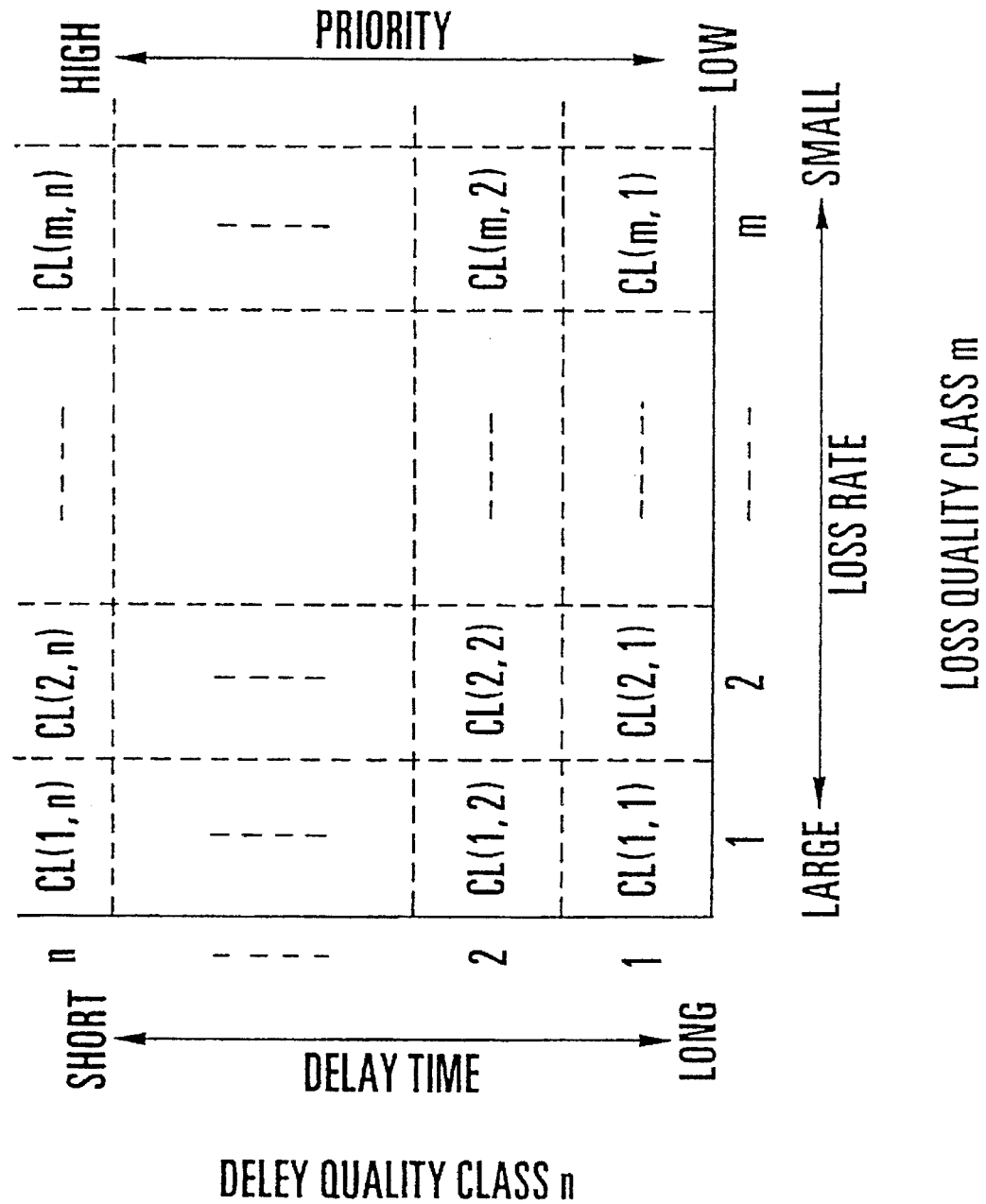
FIG. 2 is a view for explaining a read priority based on delay quality classes.

FIG. 2 explains a read priority based on delay quality classes. A loss quality class and a delay quality class added to an input cell are represented by a priority class matrix CL(m, n). In this case, as the loss quality class $\underline{m}$ added to an input cell becomes low, the input cell loss easily occurs and has a high loss rate. As the loss quality class $\underline{m}$ becomes high, the cell loss does not easily occur and has a low loss rate.

An input cell whose delay quality class $\underline{n}$ is low is not easily read out to prolong a delay time. An input cell whose delay quality class $\underline{n}$ is high is easily read out to shorten a delay time. In a read operation, a cell whose delay quality class $\underline{n}$ is low has a lower priority, and a cell whose delay quality class $\underline{n}$ is high has a higher priority.

Figure 3:
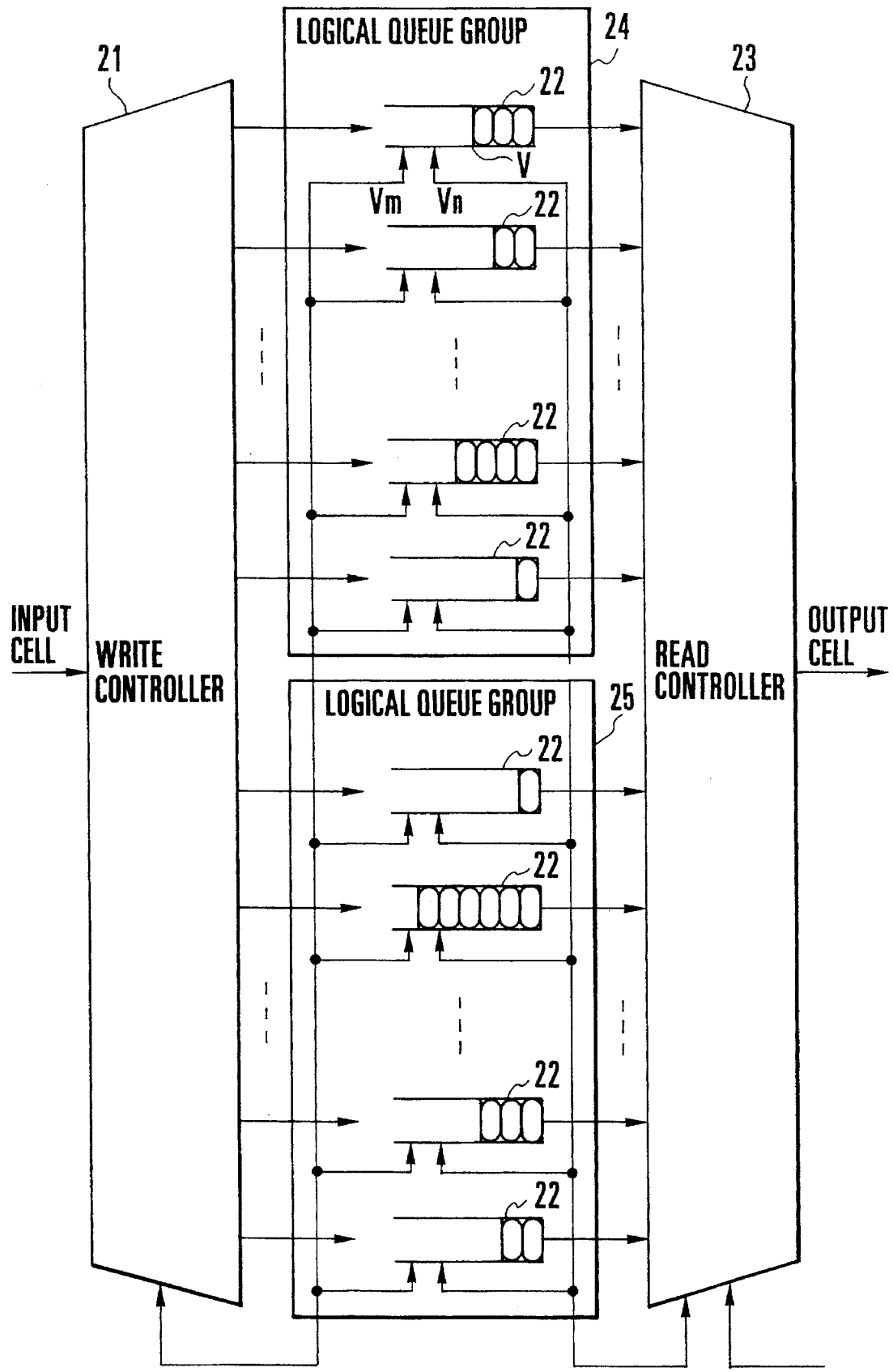
FIG. 3 is a block diagram showing the detailed arrangement of an input buffer unit shown in FIG. 1.

FIG. 3 explains the input buffer unit 2 in FIG. 1 in detail. Referring to FIG. 3, reference numerals 24 and 25 respectively denote logical queue groups each constituted by the plurality of logical queues 22 assigned to the same delay quality class. Each of the logical queue groups 24 and 25 has the logical queues 22 corresponding to the output port numbers of the switching unit 11 and broadcast outputs. For example, the logical queue group 24 is constituted by the logical queues 22 each having an initial delay quality class $\underline{n}$ defined as n=2, and the logical queue group 25 is constituted by the logical queues 22 each having an initial delay class $\underline{n}$ defined as n=3. Reference symbol V denotes a current cell storage amount in each logical queue 22; Vm, a loss threshold for determining loss of a cell; and Vn, a cell storage threshold for determining transition of a delay quality class.

Figure 4:
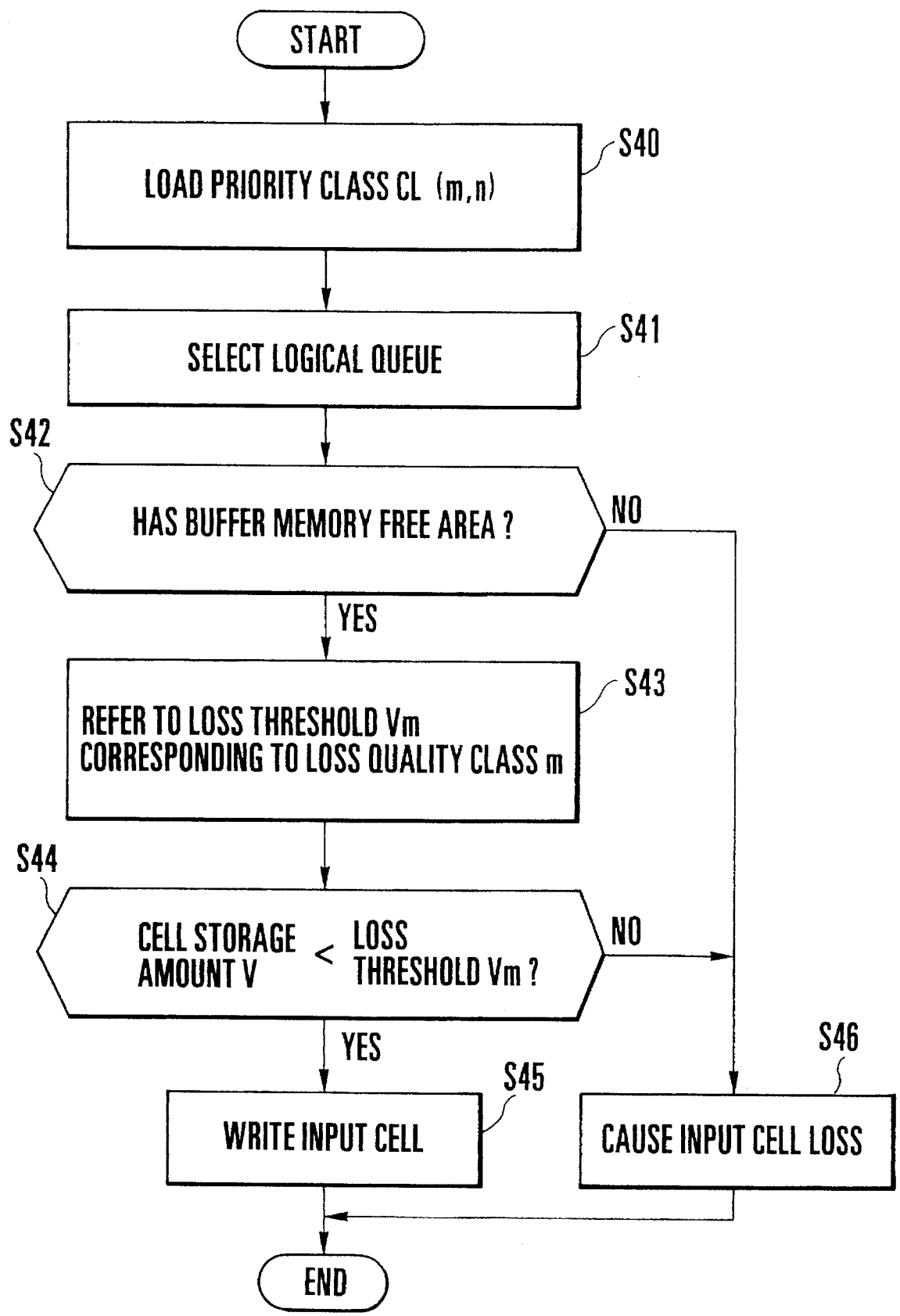
FIG. 4 is a flow chart showing a write process of the apparatus shown in FIG. 1.

A write process in the write controller 21 will be described below with reference to the flow chart shown in FIG. 4. In response to reception of an input cell, the write controller 21 loads routing information such as an output port number and a priority class CL(m, n) consisting of a loss quality class $\underline{m}$ and a delay quality class $\underline{n}$ which are added to the input cell (step S40). The logical queue 22 corresponding to the output port number is selected in the logical queue groups 24 and 25 corresponding to the delay quality class (step S41).

It is checked whether the area of the buffer memory 2a in which the selected logical queue 22 is formed has a free area (step S42). If the area of the buffer memory 2a has a free area for storing the input cell in step S42, the loss threshold Vm corresponding to the loss quality class $\underline{m}$ loaded from the input cell is referred to (step S43), and the current cell storage amount V in the selected logical queue 22 is compared with the loss threshold Vm (step S44). If the cell storage amount V is smaller than the loss threshold V in step S44, it is determined that the selected logical queue 22 has a capacity which is large enough to write the input cell in the logical queue 22, and the input cell is written in the selected logical queue 22 (step S45).

If all the areas of the buffer memory 2a in which the selected logical queue 22 is formed are stored with cells and have no free area in step S42, or if the current cell storage amount V is equal to or larger than the loss threshold Vm in step S44, the input cell loss occurs (step S46).

In this manner, when the current cell storage amount V of the logical queue 22 selected on the basis of the priority class of the input cell and the routing information exceeds the loss threshold Vm corresponding to the loss quality class $\underline{m}$ of the input cell, the input cell loss occurs. When the cell storage amount V is equal to or smaller than the loss threshold Vm, the input cell is written in the logical queue 22. For this reason, loss control can be accurately performed for the respective logical queues 22. A complex arrangement for causing the loss of a temporarily written cell is not required. For this reason, degradation of loss characteristics caused by causing one logical queue 22 to consume a large amount of area of the buffer memory 2a can be prevented, thereby avoiding other logical queues from being adversely affected.

A read process in the read controller 23 will be described below with reference to a flow chart shown in FIG. 5. In response to a predetermined cell read timing, the read controller 23 performs a transition process for the delay quality classes $\underline{n}$ of all the logical queues 22 in the buffer memory 2a.

One of the logical queues 22 is selected in a predetermined order (step S50), and it is checked whether an output buffer threshold exceeding signal from each detector 13 of the ATM switch 1 is output to this logical queue 22 (step S51). If YES in step S51, the delay quality class of the logical queues 22 is changed into the lowest delay quality class (n=1) representing read inhibition (step S52).

Therefore, it can be confirmed that the capacity of the buffer memory 12a of the output buffer unit 12 corresponding to the selected logical queue 22 is small due to an increase in traffic or the like. The cell is inhibited from being read from the logical queue 22 until the cell storage amount of the output buffer unit 12 is decreased to disable the output buffer threshold exceeding signal.

If no output buffer threshold exceeding signal is output to the selected logical queue 22 in step S51, a cell storage threshold Vn based on a delay quality class (initial delay quality class) preset in the logical queue 22 is referred to (step S53), and the current cell storage amount Vn of the selected logical queue 22 is compared with the cell storage threshold Vn (step S54).

If the current cell storage amount V exceeds the cell storage threshold Vn in step S54, cells having the number larger than a general cell storage amount are stored in the selected logical queue 22. It is determined that the cells must be preferentially read, and the delay quality class $\underline{n}$ of the selected logical queue 22 is changed into an upper delay quality class n +1 (step S55). If the current cell storage amount V is equal to or smaller than the cell storage threshold Vn in step S54, only cells having the number smaller than the general cell storage amount are stored. For this reason, as it is determined that the cells need not be preferentially read, the delay quality class $\underline{n}$ of the logical queue 22 is changed into an initial class (step S56).

As described above, the transition process related to the delay quality class of the selected logical queue 22 is finished on the basis of the cell storage amount of the buffer memory 12a of the output buffer unit 12 and the cell storage amount of the logical queues formed in the buffer memory 2a of the input buffer unit 2, and this transition process is performed for all the logical queues 22 (step S57).

Figure 6:
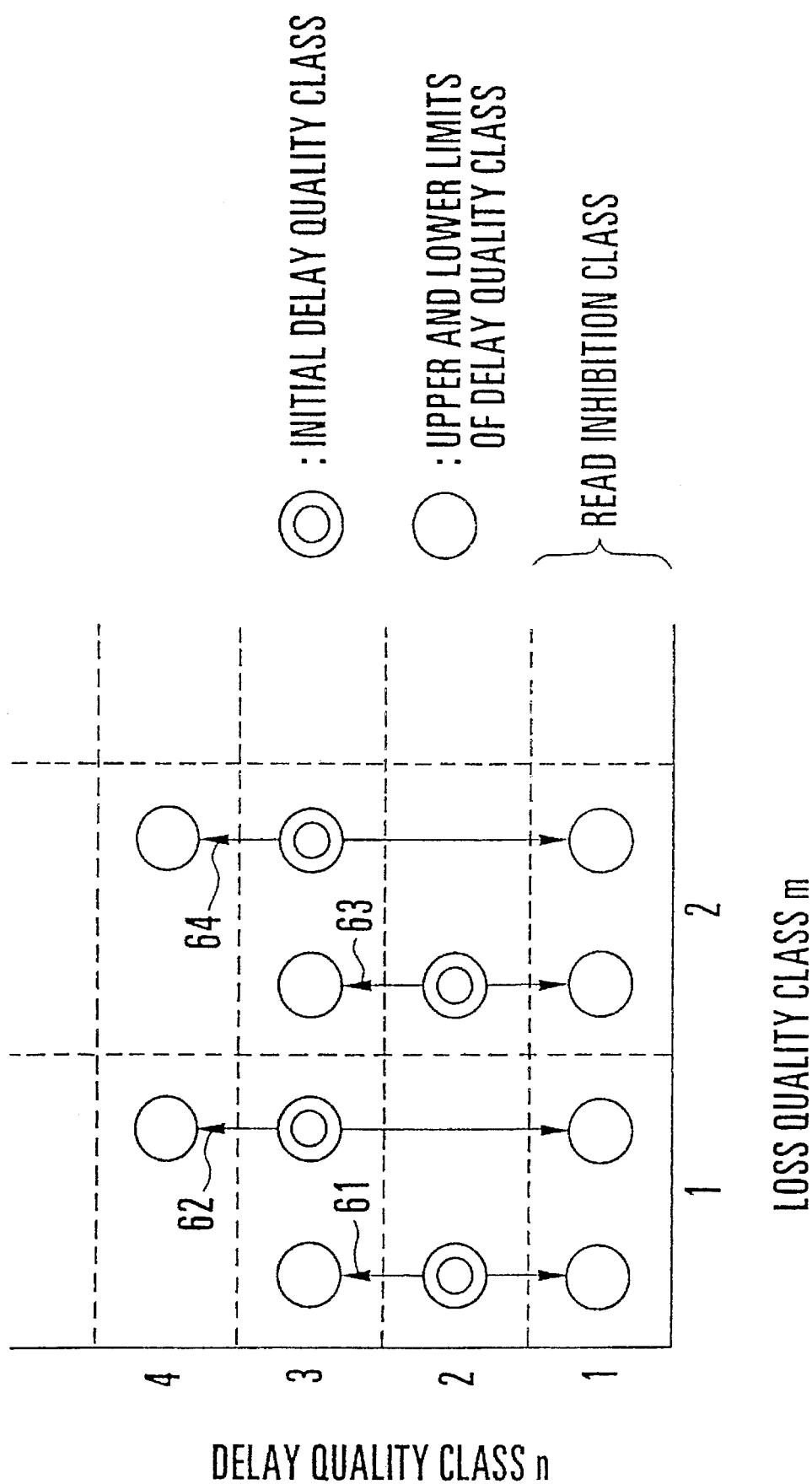
FIG. 6 is a view for explaining transition of priority classes.
Figure 7:
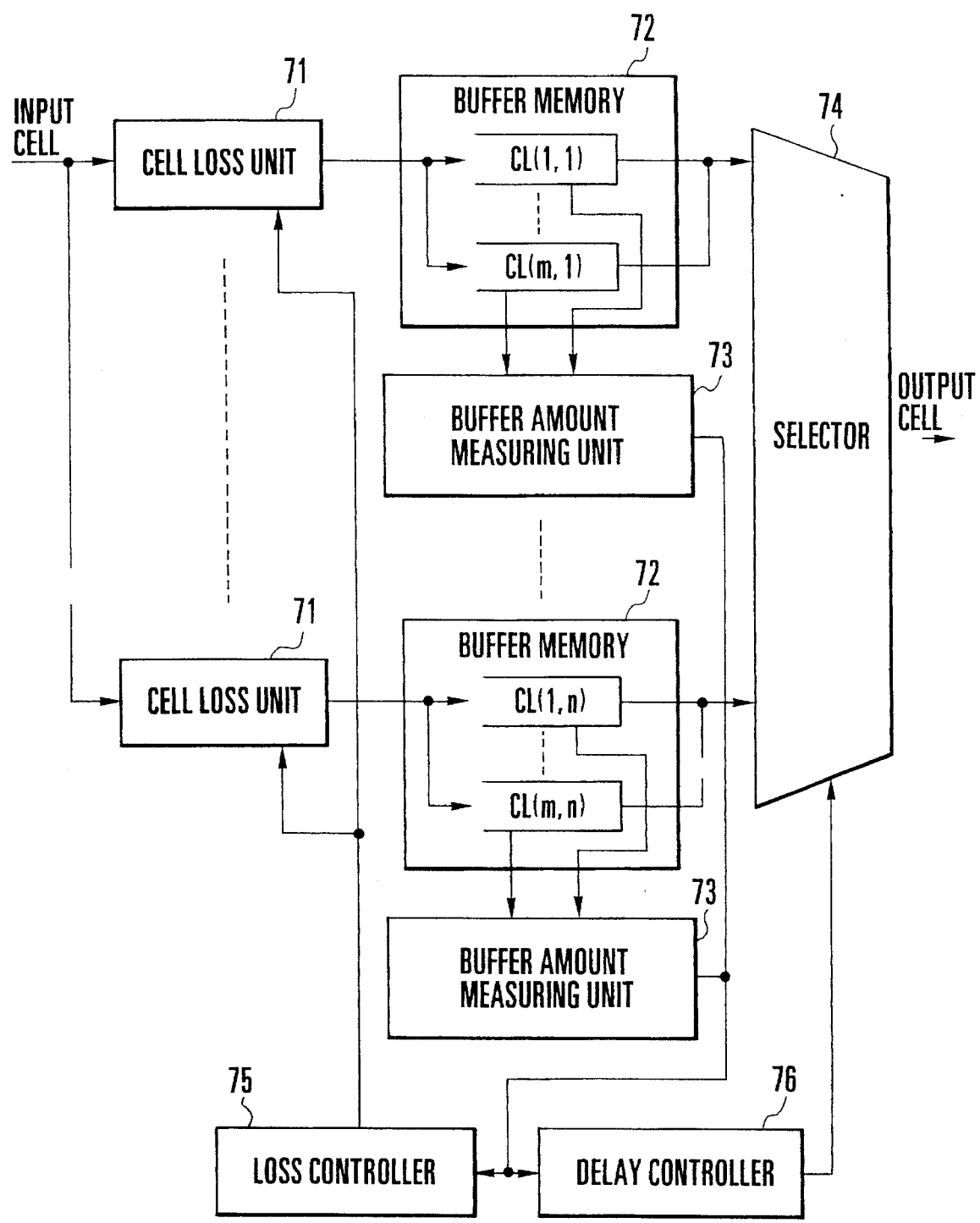
FIG. 7 is a block diagram showing the arrangement of a conventional priority control apparatus for cells in an output buffer type ATM switch.

FIG. 6 explains transition related to the priority class of each logical queue 22. Reference numerals 61 to 64 denote logical queues. Reference symbols ⊙ denote the initial delay quality classes of the logical queues 61 to 64; and ○, delay quality classes which can be changed. That is, the symbols ○ denote the upper and lower limits of transition.

Referring to FIG. 6, for example, the initial delay quality class $\underline{n}$ of the logical queue 62 is set to be "3". When an output buffer threshold exceeding signal is output to the logical queue 62, the delay quality class $\underline{n}$ is changed into "1" which represents the lowest delay quality class, and a cell is inhibited from being read from the logical queue 62. Thereafter, the delay quality class returns to "3" which represents an initial delay quality class $\underline{n}$.

When a current cell storage amount V of the logical queue 62 is equal to or smaller than a cell storage threshold Vm corresponding to the initial delay quality class "3", the delay quality class of the logical queue 62 is changed into the initial delay quality class. When the cell storage amount V exceeds a cell storage threshold Vm, the delay quality class $\underline{n}$ of the logical queue 62 is changed into a delay quality class "4" having a level higher than the class "3" by one level, and the priority for reading cells from the logical queue 62 is set to be high.

In this case, although the delay quality class $\underline{n}$ is changed into a class having a level higher than the delay quality class $\underline{n}$ by one level, this transition destination can satisfactorily correspond to maximum traffic which can be instantaneously input from a user (terminal) who selects and subscribes the priority class of the transition destination, and the transition destination is determined on the basis of a predetermined correspondence limit offered as a service. The transition amount is set depending on the interval between delay quality classes.

Note that loss quality classes are not changed even when these delay quality classes are changed.

Figure 5:
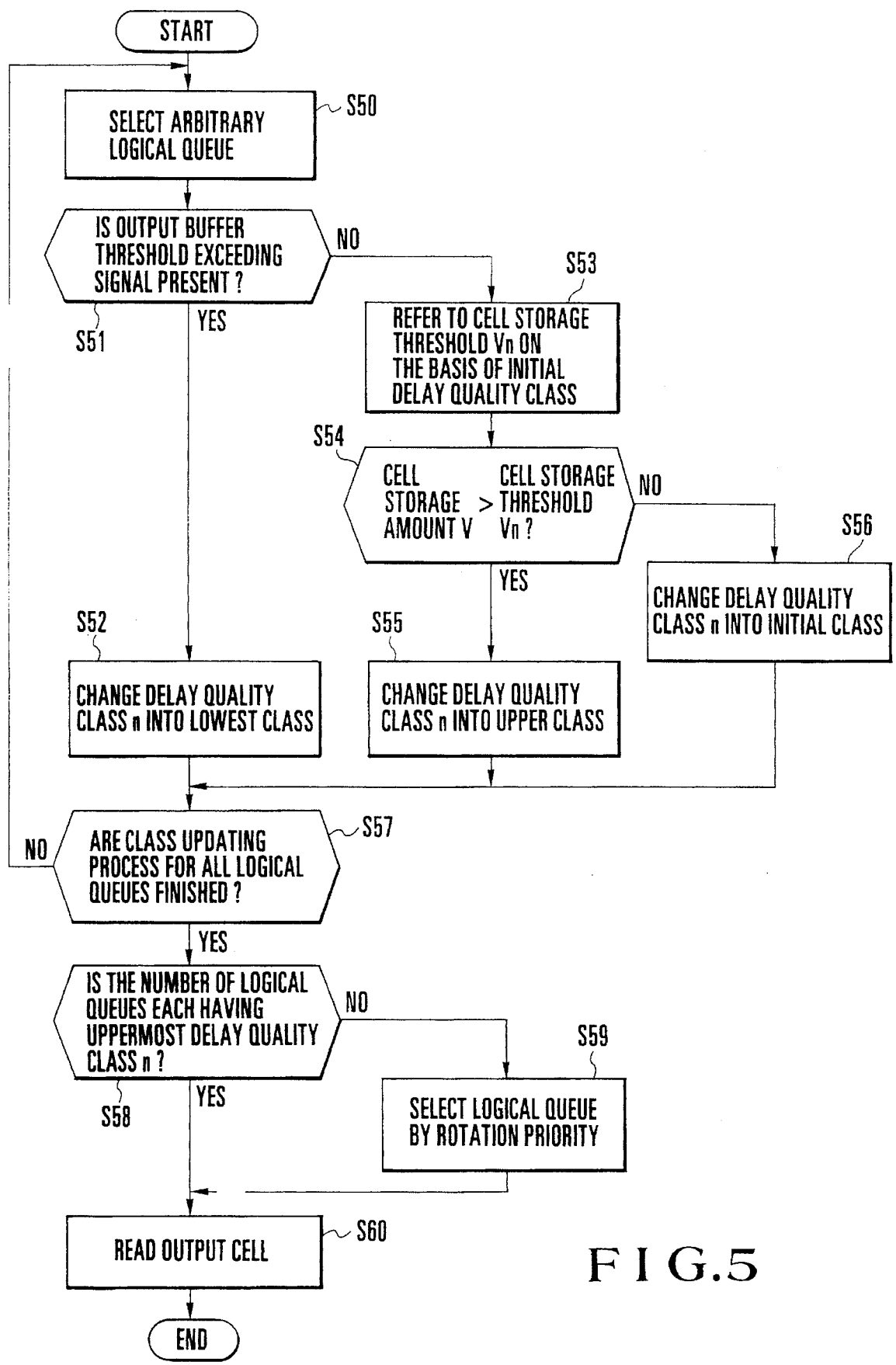
FIG. 5 is a flow chart showing a read process of the apparatus shown in FIG. 1.

Referring to FIG. 5, if the transition process for all the logical queues 22 is finished in step S57, of all the logical queues 22, the logical queue 22 having an uppermost delay quality class is selected. It is checked whether the number of the logical queues 22 each having the uppermost delay quality class is one (step S58). If the number of the logical queues 22 each having the uppermost delay quality class is one in step S58, cells are read from the logical queue 22 and output to the ATM switch 1 (step S60). If the plurality of logical queues 22 are selected in step S58, one logical queue 22 is selected from the plurality of logical queues 22 by a predetermined selecting method such as a rotation priority method in which logical queues are sequentially selected at equal intervals (step S59). The cells are read from the selected logical queue 22 and output to the ATM switch 1 (step S60).

Therefore, the plurality of logical queues 22 are formed in the input buffer unit 2 in correspondence with delay quality classes and output port numbers, and an input cell is written in each logical queue 22 in accordance with the priority class of the input cell and routing information. The delay quality class of each of all the logical queues is changed into an upper or lower class in accordance with an increase/decrease in cell storage amount V, and cells are read from the logical queue 22 having the uppermost class. For this reason, even if an excessive traffic is spontaneously input to a logical queue having one priority class, cells are preferentially read from the cell by changing the priority class into an upper delay quality class. Therefore, the method and apparatus for performing priority control for cells can flexibly cope with a change in traffic.

When the current cell storage amount V of the logical queue 22 corresponding to the priority classes of input cells exceeds the cell storage threshold Vn corresponding to the initial delay quality class of the logical queue 22, the delay quality class n of the logical queue 22 is changed into an upper class. When the cell storage amount V is equal to and lower than the cell storage threshold Vn, the delay quality class of the logical queue 22 is changed into the initial delay quality class. For this reason, transition control can more accurately performed with respect to the respective logical queues 22. In addition, when the lower quality class of the logical queue 22 is changed into an upper class, the delay time of the logical queue 22 originally having an upper class is prolonged, and the upper class of this logical queue 22 is changed into an upper class having a level higher than that of the upper class of the logical queue 22 originally having the upper class in accordance with an increase in cell storage amount. Therefore, original delay characteristics can be obtained without being influenced by the transition of the lower class.

Furthermore, the detector 13 for outputting an output buffer threshold exceeding signal to the logical queue 22 corresponding to the output port 15 of the output buffer unit 12 when the number of cells stored in the buffer memory in the output buffer unit 12 exceeds a predetermined threshold is arranged, and the delay quality class of the logical queue 22 to which the output buffer threshold exceeding signal is output is changed into a lowest read inhibition class. For this reason, an excessive traffic is spontaneously input to another line. When the free area of the buffer memory in the corresponding output buffer unit 12 becomes small, read access of cells from the input buffer unit 2 is temporarily stopped, and the logical queues 22 of each input buffer unit 2 can flexibly cope with an increase in the cell storage amount in the output buffer unit 12. At the same time, when the delay quality classes of the logical queues 22 are changed into read inhibition classes, read access of cells from each input buffer unit 2 can be controlled to be stopped without any complex arrangement.

The write controller 21 causes an input cell loss when the cell storage amount in the logical queue 22 selected in accordance with the input cell exceeds a loss threshold corresponding to a loss quality class added to the input cell. The write controller 21 writes the input cell in the logical queue 22 when the cell storage amount is equal to or smaller than the loss cell threshold. For this reason, loss control can be accurately performed for the respective logical queues 22, and a conventional complex arrangement for causing a written cell loss is not required. In addition, unlike in a conventional technique, degradation of loss characteristics caused by causing one logical queue 22 to consume a large amount of area of the buffer memory 2a can be prevented, thereby avoiding other logical queues from being adversely affected.

What is claimed is:

1. A method of performing priority control for cells in an output buffer type ATM switch including a switching unit, having a plurality of input ports and a plurality of output ports, for switching/outputting the cells input from said input ports to said output ports in accordance with routing information, and a plurality of output buffer units having output buffer memories, connected to said output ports of said switching unit, for temporarily storing the cells output from said output ports to perform output control of the cells, comprising the steps of:

adding a loss quality class, a delay quality class and the routing information to each of the cells;

virtually setting a plurality of logical queues, for temporarily storing the cells, in input buffer memories in accordance with the delay quality classes and the routing information;

selectively writing the input cells in said logical queues on the basis of the loss quality classes and the routing information added to the cells;

performing a transition process for all said logical queues to change the delay quality class of each of said logical queues into one of upper and lower classes depending on a cell storage amount in said logical queue; and upon completion of the transition process, reading the cells from said logical queue having the delay quality class which is an uppermost class.

2. A method according to claim 1, wherein the step of performing the transition process comprises the steps of:

checking whether a current cell storage amount in each of said logical queues exceeds a predetermined cell storage threshold corresponding to an initial delay quality class preset in said logical queues;

changing a delay quality cell of said selected logical queue into an upper class when the cell storage amount exceeds the cell storage threshold; and changing the delay quality class of the logical queue into the initial delay quality class when the cell storage amount is not larger than the cell storage threshold.

3. A method according to claim 1, further comprising the steps of:

checking whether a cell storage amount in said output buffer units exceeds a predetermined cell storage threshold; and when the cell storage amount exceeds the cell storage threshold, changing a delay quality class of said logical queue, corresponding to an output port of said switching unit connected to said output buffer unit representing that the cell storage amount exceeds the cell storage threshold, into a lowest delay quality class.

4. A method according to claim 3, wherein the lowest delay quality class is a read inhibition class, and read access of cells from said logical queue having a delay quality class changed into the read inhibition class is inhibited.

5. A method according to claim 1, wherein the step of selectively writing the input cells in said logical queues, comprises the steps of:

checking whether the cell storage amount in said logical queue selected on the basis of the delay quality classes and the routing information exceeds a loss threshold corresponding to the loss quality class added to the cell;

causing a cell loss when the cell storage amount exceeds the loss threshold; and writing the cell in said selected logical queue when the cell storage amount is not larger than the loss threshold.

6. A method according to claim 1, wherein the step of reading the cells from said logical queue comprises the step of, when a plurality of logical queues each having an uppermost delay quality class are present, selecting said logical queues each having the uppermost delay quality class in a predetermined order to sequentially read cells from said logical queues.

7. A priority control apparatus for cells in an output buffer type ATM switch, comprising:

switching means, including a plurality of input ports and a plurality of output ports, for selecting/outputting the cells input from said input ports to said output ports in accordance with routing information of the cells to which loss quality classes and delay quality classes are added;

a plurality of buffer means having output buffer memories, connected to said output ports of said switching means, for temporarily storing the cells output from said output ports to perform output control for the cells;

a plurality of logical queues, virtually set in input buffer memories in accordance with the delay quality classes and the routing information, for temporarily storing the cells;

write control means for performing write control for writing the input cells in said logical queues on the basis of the loss quality classes and the routing information added to the cells; and read control means, respectively, arranged for said input ports of said switching means, for performing read control for reading the cells from said logical queue having the delay quality class changed into an uppermost class after a delay quality class of each of all said logical queues is changed into one of upper and lower classes depending on a cell storage amount in said logical queue.

8. An apparatus according to claim 7, wherein said read control means comprises:

determining means for checking whether a current cell storage amount in each of said logical queues exceeds a predetermined cell storage threshold corresponding to an initial delay quality class preset in said logical queues; and delay quality class transition means for changing a delay quality class of said selected logical queue into an upper class when the cell storage amount exceeds the cell storage threshold, and changing the delay quality class of said logical queue into the initial delay quality class when the cell storage amount is not larger than the cell storage threshold.

9. An apparatus according to claim 7, further comprising:

determining means for checking whether the cell storage amount in each of said output buffer means exceeds a predetermined storage threshold; and delay quality class transition means for changing a delay quality class of said logical queue, corresponding to an output port of said switching means connected to said output buffer means representing that the cell storage amount exceeds the cell storage threshold, into a lowest delay quality class.

10. An apparatus according to claim 9, wherein the lowest delay quality class is a read inhibition class, and said read control means inhibits cells from being read from said logical queue having a delay quality class changed into the read inhibition class.

11. An apparatus according to claim 7, wherein said write control means comprises the steps of:

determining means for checking whether the cell storage amount in said logical queue selected on the basis of the delay quality classes and the routing information exceeds a loss threshold corresponding to the loss quality class added to the cell;

cell loss means for causing a cell loss when the cell storage amount exceeds the loss threshold; and writing means for writing the cell in said selected logical queue when the cell storage amount is not larger than the loss threshold.

12. An apparatus according to claim 7, wherein read control means comprises selecting means for selecting said logical queues each having the uppermost delay quality class in a predetermined order to sequentially reading cells from said logical queues when a plurality of logical queues each having an uppermost delay quality class are present.

13. An apparatus according to claim 7, wherein said switching means and said output buffer means constitute an output buffer type ATM switch, and said logical queues, said write control means, and read control means constitute an input buffer unit.

* * * * *